United States Patent
Muramatsu

(10) Patent No.: US 11,398,220 B2
(45) Date of Patent: Jul. 26, 2022

(54) SPEECH PROCESSING DEVICE, TELECONFERENCING DEVICE, SPEECH PROCESSING SYSTEM, AND SPEECH PROCESSING METHOD

(71) Applicant: Yamaha Corporation, Hamamatsu (JP)

(72) Inventor: Mikio Muramatsu, Fukuroi (JP)

(73) Assignee: Yamaha Corporation, Hamamatsu (JP)

( * ) Notice: Subject to any disclaimer, the term of this patent is extended or adjusted under 35 U.S.C. 154(b) by 306 days.

(21) Appl. No.: 16/553,406

(22) Filed: Aug. 28, 2019

(65) Prior Publication Data

US 2019/0385589 A1 Dec. 19, 2019

Related U.S. Application Data

(63) Continuation of application No. PCT/JP2017/010992, filed on Mar. 17, 2017.

(51) Int. Cl.
| | | |
|---|---|---|
| *G10L 15/00* | (2013.01) | |
| *G10L 19/26* | (2013.01) | |
| *G10L 21/0388* | (2013.01) | |
| *G10L 21/007* | (2013.01) | |
| *G10L 21/0232* | (2013.01) | |

(Continued)

(52) U.S. Cl.
CPC ............ *G10L 15/005* (2013.01); *G10L 19/26* (2013.01); *G10L 21/003* (2013.01); *G10L 21/007* (2013.01); *G10L 21/02* (2013.01); *G10L 21/0232* (2013.01); *G10L 21/0364* (2013.01); *G10L 21/0388* (2013.01)

(58) Field of Classification Search
CPC . G10L 15/005; G10L 21/0232; G10L 21/003; G10L 21/02; G10L 21/0364; G10L 21/007
See application file for complete search history.

(56) References Cited

U.S. PATENT DOCUMENTS 6,243,675 B1 * 6/2001 Ito .......................... G06F 40/58
704/232
10,643,636 B2 * 5/2020 Taki ...................... A61B 5/123
(Continued)

FOREIGN PATENT DOCUMENTS

JP 2008-103780 A 5/2008
JP 2008103780 A * 5/2008
(Continued)

OTHER PUBLICATIONS

International Search Report (PCT/ISA/210) issued in PCT Application No. PCT/JP2017/010992 dated May 30, 2017 with English translation (five (5) pages).

(Continued)

*Primary Examiner* — Samuel G Neway
(74) *Attorney, Agent, or Firm* — Crowell & Moring LLP

(57) ABSTRACT

A speech processing method executes at least one of first speech processing and second speech processing. The first speech processing identifies a language based on speech, performs signal processing according to the identified language, and transmits the speech on which the signal processing has been performed, to a far-end-side. The second speech processing identifies a language based on speech, receives the speech from the far-end-side, and performs signal processing on the received speech, according to the identified language.

19 Claims, 12 Drawing Sheets

(51) Int. Cl.
*G10L 21/0364* (2013.01)
*G10L 21/003* (2013.01)
*G10L 21/02* (2013.01)

(56) References Cited

U.S. PATENT DOCUMENTS

| | | | | |
|---|---|---|---|---|
| 2004/0015347 | A1* | 1/2004 | Kikuchi | G10L 21/04 704/225 |
| 2006/0167681 | A1* | 7/2006 | Rikimaru | A61B 5/00 704/205 |
| 2008/0221862 | A1* | 9/2008 | Guo | G06F 40/58 704/2 |
| 2010/0106499 | A1* | 4/2010 | Lubowich | G10L 15/005 704/235 |
| 2011/0035219 | A1* | 2/2011 | Kadirkamanathan | G10L 15/005 704/239 |
| 2012/0010886 | A1* | 1/2012 | Razavilar | G10L 15/005 704/246 |
| 2012/0016655 | A1* | 1/2012 | Travieso | G06F 16/9566 704/2 |
| 2013/0238311 | A1* | 9/2013 | Lou | G06F 40/58 704/3 |
| 2014/0370858 | A1* | 12/2014 | Sasaki | G10L 21/0364 455/414.1 |
| 2015/0120293 | A1* | 4/2015 | Wohlert | G10L 21/0364 704/235 |
| 2015/0256930 | A1* | 9/2015 | Yamakawa | G10L 21/0208 704/205 |
| 2017/0300976 | A1* | 10/2017 | Dogruoz | G06Q 30/0241 |
| 2018/0089172 | A1* | 3/2018 | Needham | H04L 67/306 |
| 2019/0385589 | A1* | 12/2019 | Muramatsu | G10L 15/005 |

FOREIGN PATENT DOCUMENTS

| | | |
|---|---|---|
| JP | 2009-210868 A | 9/2009 |
| JP | 2010-204564 A | 9/2010 |

OTHER PUBLICATIONS

Japanese-language Written Opinion (PCT/ISA/237) issued in PCT Application No. PCT/JP2017/010992 dated May 30, 2017 (four (4) pages).

Japanese-language Office Action issued in Japanese Application No. 2019-505658 dated Oct. 6, 2020 with English translation (10 pages).

* cited by examiner

SPEECH PROCESSING DEVICE, TELECONFERENCING DEVICE, SPEECH PROCESSING SYSTEM, AND SPEECH PROCESSING METHOD

CROSS REFERENCE TO RELATED APPLICATIONS

The present application is a continuation of International Application No. PCT/JP2017/010992, filed on Mar. 17, 2017, the entire contents of which is incorporated herein by reference.

BACKGROUND OF THE INVENTION

1. Field of the Invention

A preferred embodiment of the present invention relates to a speech processing device, a teleconferencing device, a speech processing system, and a speech processing method that process speech.

2. Description of the Related Art

A speech processing device of Japanese Unexamined Patent Application Publication No. 2009-210868 discloses a configuration in which a language of guidance speech is selected and the guidance speech is processed by a filter corresponding to a selected language.

The speech processing device disclosed in Japanese Unexamined Patent Application Publication No. 2009-210868 only processes a guidance voice. However, for example, in a case in which a conversation is performed between remote places through a network, it is necessary to adjust sound quality to suit a user on a near-end-side or adjust sound quality to suit a user on a far-end-side.

SUMMARY OF THE INVENTION

In view of the foregoing, a preferred embodiment of the present invention is directed to provide a speech processing device, a teleconferencing device, a speech processing system, and a speech processing method that perform processing suitable for a used language, in a speech processing device that performs a conversation with a far-end-side.

A speech processing device according to a preferred embodiment of the present invention includes a language identifier, a signal processor, and a communicator. The language identifier identifies a language based on speech. The signal processor performs signal processing according to the language that the language identifier has identified, and the communicator transmits the speech on which the signal processing has been performed by the signal processor to a far-end-side or the communicator inputs the speech received from the far-end-side to the signal processor.

According to a preferred embodiment of the present invention, a speech processing device that performs a conversation with a far-end-side is able to perform appropriate processing corresponding to a used language.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
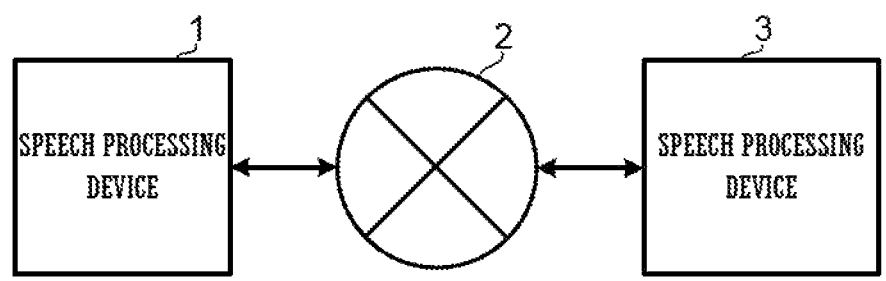
FIG. 1 is a diagram showing a configuration of a speech processing system.

FIG. 1 is a diagram showing a configuration of a speech processing system according to a preferred embodiment of the present invention. The speech processing system includes a speech processing device 1 and a speech processing device 3 that are connected to each other through a network 2.

The speech processing device 1 is installed at a first spot. The speech processing device 3 is set at a second spot. In other words, the speech processing device 1 and the speech processing device 3 are installed in places remote from each other.

Figure 2:
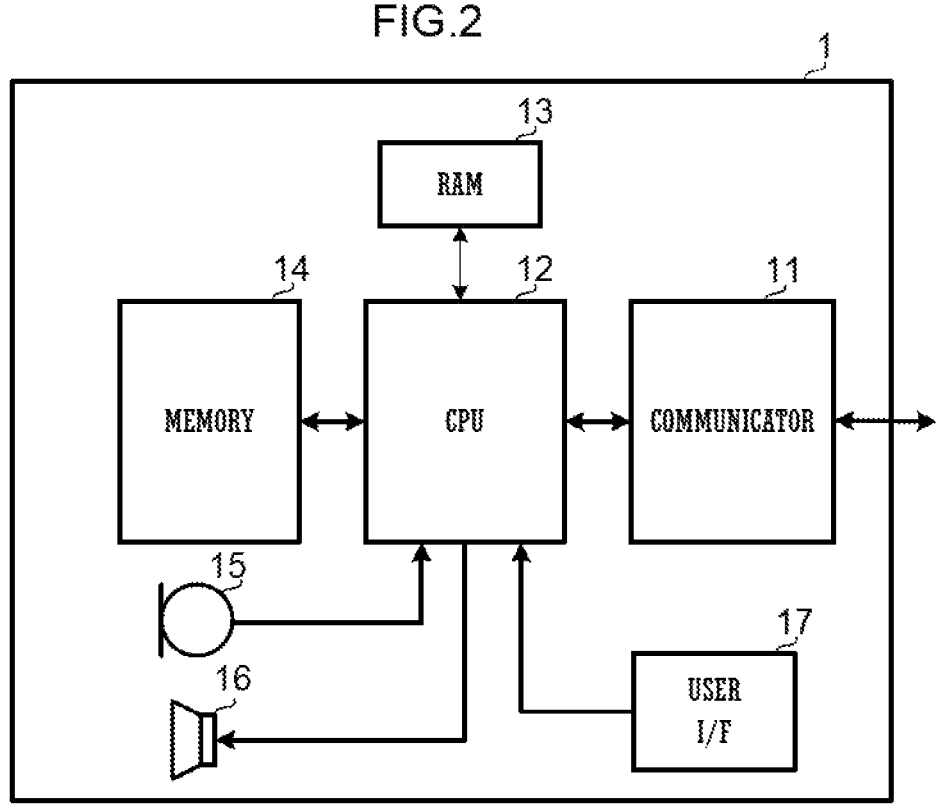
FIG. 2 is a block diagram showing a configuration of a speech processing device.

FIG. 2 is a block diagram showing a configuration of the speech processing device 1. It is to be noted that the speech processing device 1 and the speech processing device 3 have the same configurations and the same functions.

The speech processing device 1 includes a communicator 11, a CPU 12, a RAM 13, a memory 14, a microphone 15, a speaker 16, and a user interface (I/F) 17.

The CPU 12 reads a program from the memory 14 being a storage medium and temporarily stores the program in the RAM 13, and thus performs various operations. For example, the CPU 12 performs processing of identifying a language (hereafter referred to as a used language) to be used, filter generation processing, and signal processing. The signal processing is band-pass filter processing, for example.

The memory 14 includes a flash memory or a hard disk drive (HDD), for example. The memory 14 stores a program for operating the CPU 12 as described above.

The user I/F 17 accepts operation from a user. The operation accepted from the user includes adjustment of sound volume, for example.

The microphone 15 obtains speech of a talker. The microphone 15 outputs an audio signal according to the obtained speech to the CPU 12. The CPU 12 performs signal processing on the audio signal inputted from the microphone 15, and outputs the audio signal to the communicator 11. It is to be noted that the speech processing device 1 may include a not-shown processor (DSP: Digital Signal Processor) exclusively used for signal processing. In such a case, according to instructions of the CPU 12, the DSP performs signal processing.

The communicator 11 transmits the audio signal inputted from the CPU 12 to another speech processing device (the speech processing device 3) connected through the network. In addition, the communicator 11 receives an audio signal from the speech processing device 3, and outputs the audio signal to the CPU 12.

The CPU 12 performs signal processing on the audio signal inputted from the communicator 11, and outputs the audio signal to the speaker 16.

The speaker 16 outputs speech based on the audio signal inputted from the CPU 12.

As described above, the speech processing device 1 transmits and receives an audio signal with the speech processing device 3 installed in a remote place. As a result, users are able to perform a conversation between remote places.

Figure 3:
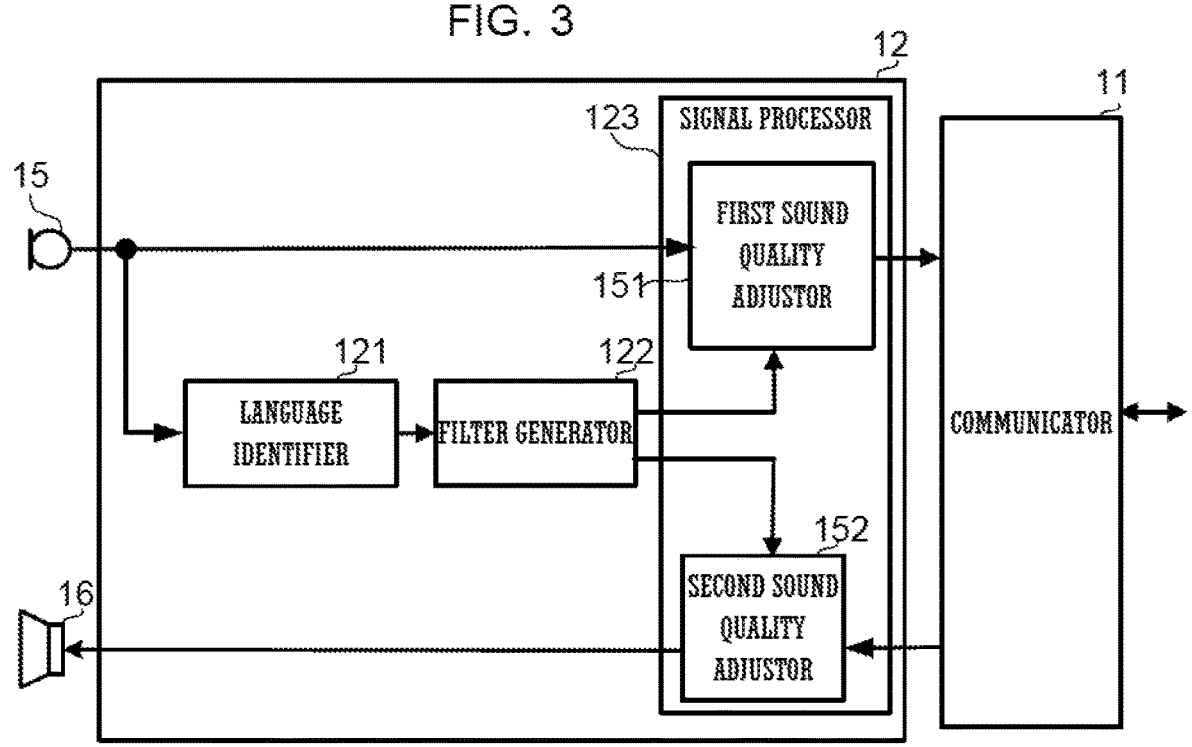
FIG. 3 is a block diagram showing a functional configuration of the speech processing device.
Figure 4:
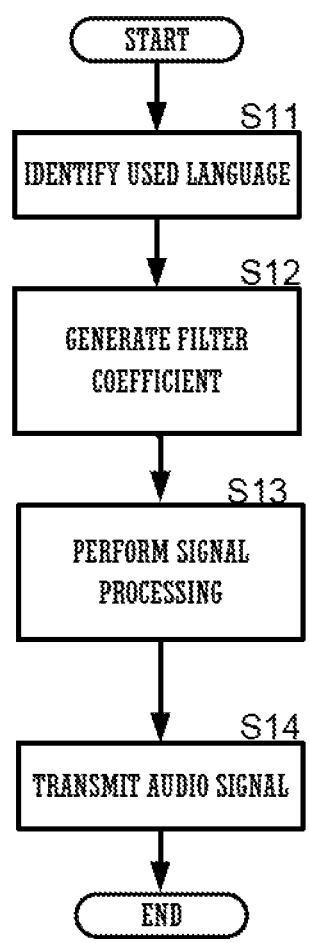
FIG. 4 is a flow chart showing an operation of the speech processing device.

Furthermore, the speech processing device 1 identifies a language and performs signal processing according to the identified language. FIG. 3 is a block diagram showing a functional configuration of the speech processing device. FIG. 4 is a flow chart showing an operation of the speech processing device 1 in a case of adjusting sound quality at a time of transmission.

The speech processing device 1 constitutes a language identifier 121, a filter generator 122, and a signal processor 123 by an operating program the CPU 12 executes.

The language identifier 121 receives an input of an audio signal from the microphone 15. The language identifier 121 identifies a language based on an inputted audio signal (S11). In the present preferred embodiment, the language identifier 121 identifies a used language. The language identifier 121 identifies the language, for example, by speech recognition processing. It is to be noted that language identification by the speech recognition processing is estimation processing of extracting a speech feature amount from the inputted audio signal and estimating a language of which the speech feature amount is most similar to the extracted speech feature amount. Therefore, in the present preferred embodiment, identification is a concept including estimation.

The filter generator 122 generates a filter coefficient for emphasizing the identified language, as a parameter according to the language identified by the language identifier 121 (S12). The language of each country has a frequency band that affects listenability. For example, the frequency band from 125 Hz to 1500 Hz is important in Japanese. The speech processing device 1 is able to make speech easy to be heard by causing the audio signal of inputted Japanese to pass through the frequency band and lowering the level of other bands. In addition, for example, the frequency band from 2000 Hz to 12000 Hz is important in English. The speech processing device 1 is able to make speech easy to be heard by causing the audio signal of inputted English to pass through the frequency band and lowering the level of other frequency bands.

The filter generator 122 outputs a generated filter coefficient with frequency characteristics to the signal processor 123. The signal processor 123 includes a first sound quality adjustor 151 and a second sound quality adjustor 152. The first sound quality adjustor 151 and the second sound quality adjustors 152 are digital filters such as an FIR filter, for example. The first sound quality adjustor 151 and the second sound quality adjustor 152 set the filter coefficient inputted from the filter generator 122 and adjust the frequency characteristics as signal processing.

The first sound quality adjustor 151 processes an audio signal to be inputted from a microphone (S13). The communicator 11 transmits the audio signal on which signal processing has been performed, to a far-end-side (S14). As a result, sound quality adjustment suitable for a language that a user on a near-end-side has used is performed, and speech is emitted by the speech processing device 3 on the far-end-side. Therefore, the sound quality is adjusted to suit a user on the far-end-side.

Figure 5:
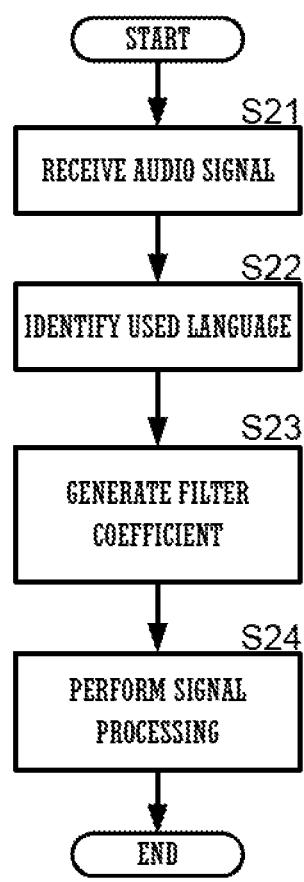
FIG. 5 is a flow chart showing an operation of the speech processing device.

FIG. 5 is a flow chart showing an operation of the speech processing device 1 in a case of adjusting sound quality at a time of receiving. First, the communicator 11 receives an audio signal from the far-end-side (S21). The language identifier 121 identifies a language (S22). While the present preferred embodiment shows an example in which the language identifier 121 identifies a language based on an audio signal inputted from the microphone 15, the language identifier 121 may identify a language based on an audio signal received from the far-end-side. However, in a case in which a language based on the audio signal inputted from the microphone 15 is identified, speech that the user on the far-end-side has spoken is subject to the sound quality adjustment suitable for a language on the near-end-side, so that the sound quality is adjusted to make it easy for the user on the near-end-side to hear the speech.

Next, the filter generator 122, according to the language that has been identified by the language identifier 121, generates a filter coefficient for emphasizing the identified language (S23). The second sound quality adjustor 152 processes the audio signal received from the far-end-side (S24).

As a result, the speech that the user on the far-end-side has spoken is subject to the sound quality adjustment suitable for a language on the near-end-side and is emitted by the speech processing device 1 on the near-end-side. Therefore, the sound quality is adjusted to suit the user on the near-end-side.

While the above description shows an example in which the sound quality adjustment is performed on a transmission side or the sound quality adjustment is performed on a reception side, the sound quality adjustment may be performed on both the transmission side and the reception side. In addition, the speech processing device 1 on the near-end-side may perform only language identification that identifies a language, and the speech processing device 3 on the far-end-side may perform the sound quality adjustment according to the language that has been identified on the near-end-side. Alternatively, the speech processing device 1 on the near-end-side may perform the language identification and generate a filter coefficient, and the speech processing device 3 on the far-end-side may perform the sound quality adjustment according to the filter coefficient generated on the near-end-side.

As described above, the speech processing device that performs a conversation with the far-end-side is able to perform appropriate processing for a used language. For example, the speech processing device, even when a used language is changed during conversation, the language identifier 121 identifies the used language in real time, and an appropriate filter coefficient is generated.

Figure 6:
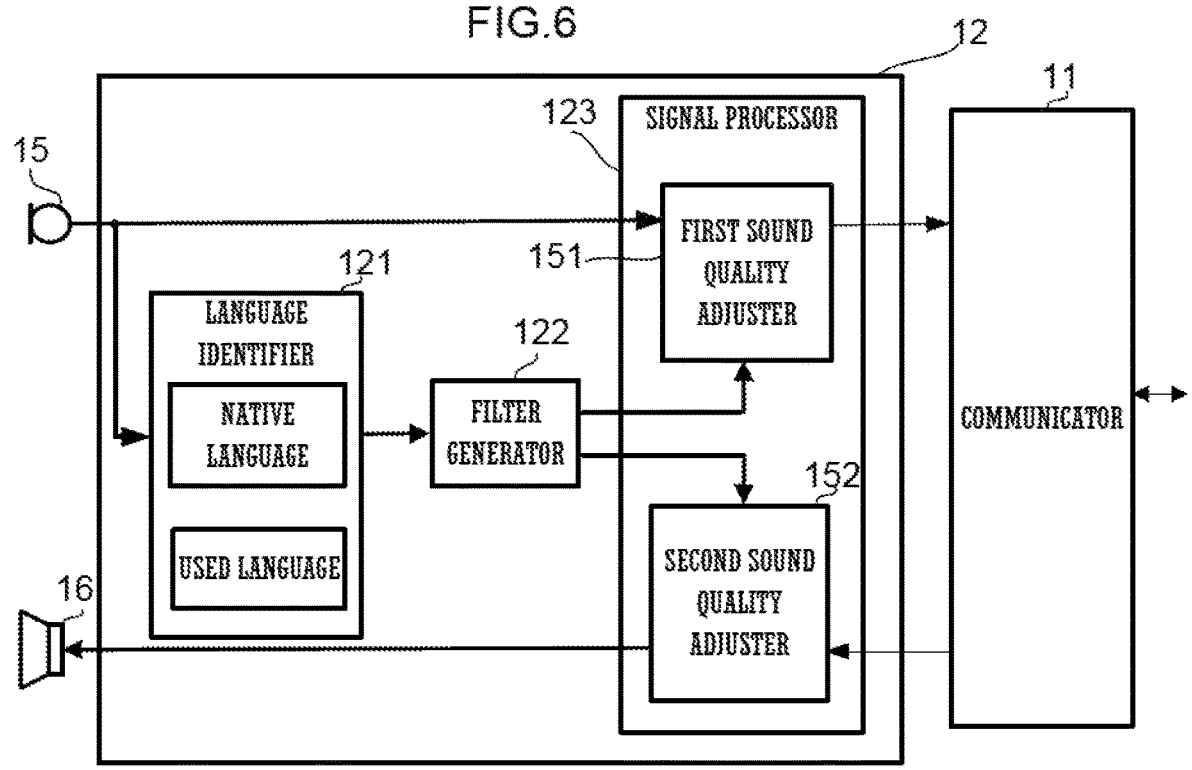
FIG. 6 shows an example of identifying a used language and a native language as language identification.
Figure 7:
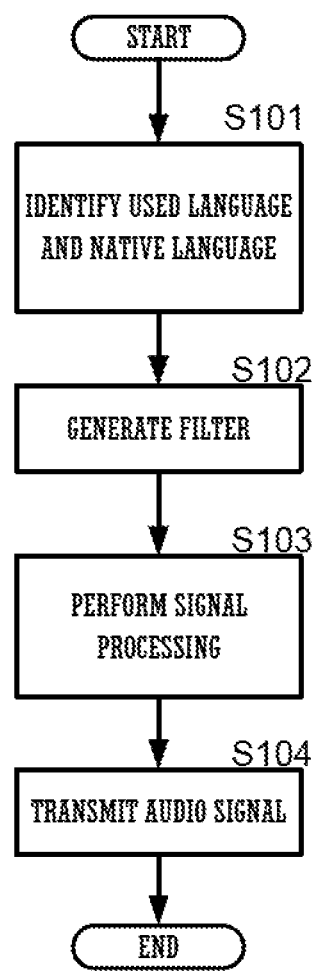
FIG. 7 is a flow chart showing an operation of the speech processing device.
Figure 8:
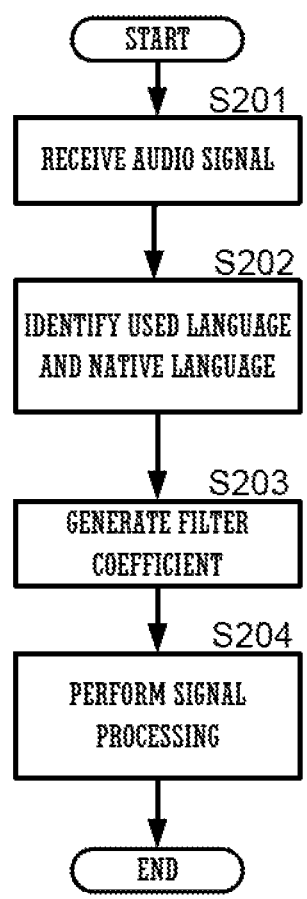
FIG. 8 is a flow chart showing an operation of the speech processing device.

FIG. 6 shows an example of identifying a used language and a native language as language identification. FIG. 7 is a flow chart showing an operation of the speech processing device 1 in a case of adjusting sound quality at a time of transmitting. In addition, FIG. 8 is a flowchart showing an operation of the speech processing device 1 in a case of adjusting sound quality at a time of receiving. The language identifier 121 identifies a used language and a native language based on an audio signal of the microphone 15 (S101).

The language identification of the used language, in the same manner as described above, is performed, for example, by the speech recognition processing. A native language is identified based on an IP address used by the communicator 11, for example. In other words, the language identifier 121 identifies a native language based on a location corresponding to the IP address used by the communicator 11. The language identifier 121 identifies that a native language is Japanese when the location corresponding to the IP address is in Japan. In addition, it is also possible to capture face images with a camera and to identify a native language according to face recognition. For example, the language identifier 121 previously stores face images of people of each country as a database. The language identifier 121, when comparing the face image captured with the camera and a face image in the database and finding no match between the face images, specifies a face image that has the closest feature based on a feature amount of the face image, further specifies a country corresponding to the face image, and identifies a native language.

Figure 9:
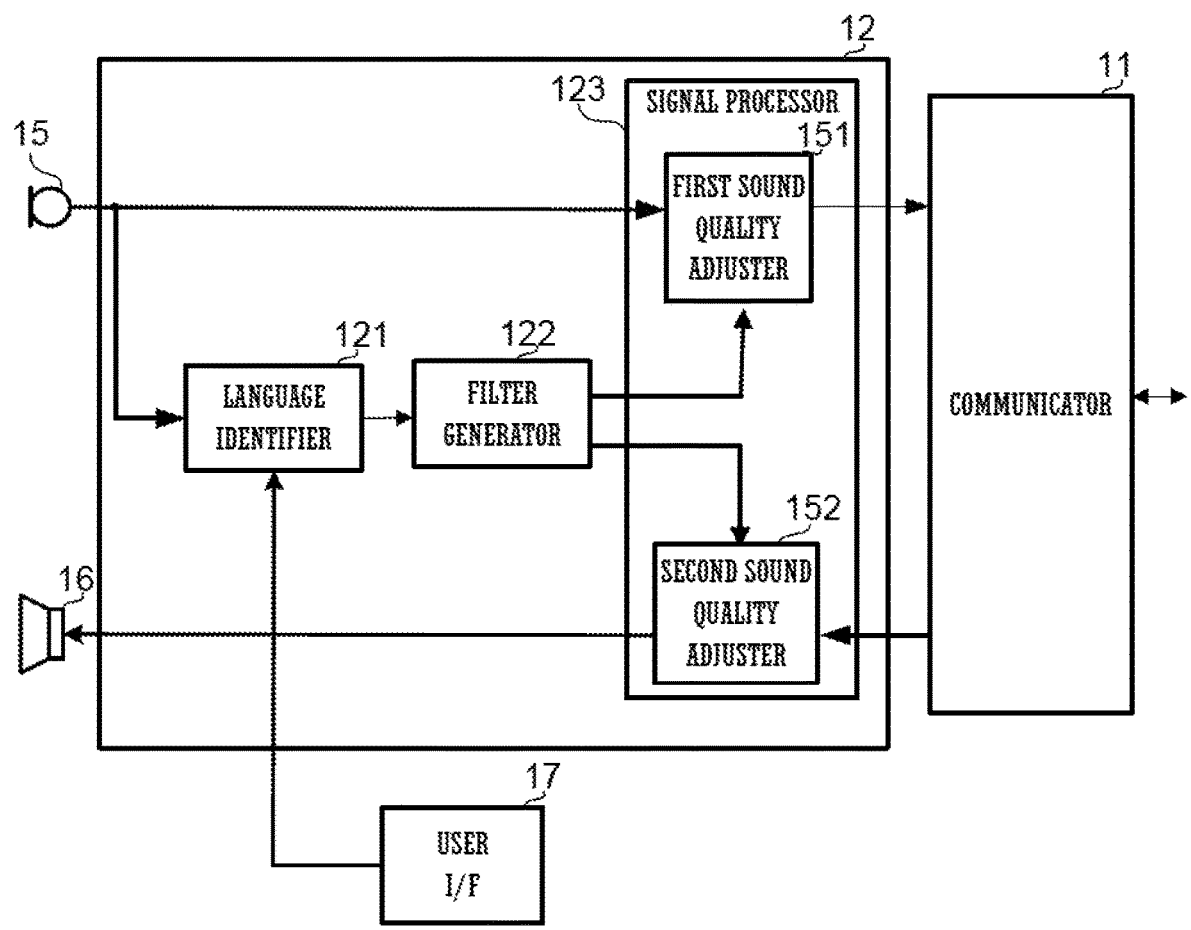
FIG. 9 is a block diagram showing a functional configuration of the speech processing device in a case of identifying a native language through a user I/F.

Alternatively, as shown in FIG. 9, the language identifier 121 may identify a native language by receiving an input of a native language from a user through the user I/F 17. More specifically, the language identifier 121 identifies a native language according to a language (a language displayed on a display when the speech processing device 1 includes the display, for example) used by the speech processing device 1.

The filter generator 122 generates a filter coefficient (a filter coefficient for the band-pass filter processing, for example) according to the native language and the used language that have been identified by the language identifier 121 (S102). For example, in a case in which the language identifier 121 has identified the native language as Japanese and the used language as English, the filter generator 122 generates a filter coefficient obtained by superimposing a filter coefficient that has the Japanese frequency band of 125 Hz to 1500 Hz as the passband and a filter coefficient that has the English frequency band of 2000 Hz to 12000 Hz as the passband.

The first sound quality adjustor 151 processes an audio signal to be inputted from the microphone 15 (S103). The communicator 11 transmits the audio signal on which signal processing has been performed, to a far-end-side (S104). As a result, for example, in a case in which the native language is Japanese and the used language is English, the sound quality that emphasizes the Japanese frequency band of 125 Hz to 1500 Hz and the English frequency band of 2000 Hz to 12000 Hz is obtained. Therefore, it is possible to adjust the sound quality of English spoken by a user of which the native language is Japanese to be easily audible.

On the other hand, as shown in FIG. 8, the speech processing device 1 receives an audio signal from a far-end-side (S201). The language identifier 121 identifies a used language and a native language (S202). The filter generator 122 generates a filter coefficient of the band-pass filter processing according to the used language and the native language that have been identified by the language identifier 121 (S203). The second sound quality adjustor 152 processes the audio signal received from the far-end-side (S204).

In such a case as well, for example, in the case in which the native language is Japanese and the used language is English, the sound quality that emphasizes the Japanese frequency band of 125 Hz to 1500 Hz and the English frequency band of 2000 Hz to 12000 Hz is obtained. Therefore, the sound quality of English is able to be adjusted to make it easy for people of which the native language is Japanese to hear English.

Furthermore, the speech processing devices 1 and 3 on both the transmission side and the reception side, by performing the above signal processing, are able to adjust and improve sound quality in the speech processing devices 1 and 3 on both sides of the transmission side and the reception side. For example, in a case in which the native language of a user of the speech processing device 1 is Japanese, the native language of a user of the speech processing device 3 is French, and the used language of the users is English, English spoken by the user (the user of the speech processing device 1) of which the native language is Japanese is adjusted to improve the listenability of English for the user (the user of the speech processing device 3) of which the native language is French.

Figure 10:
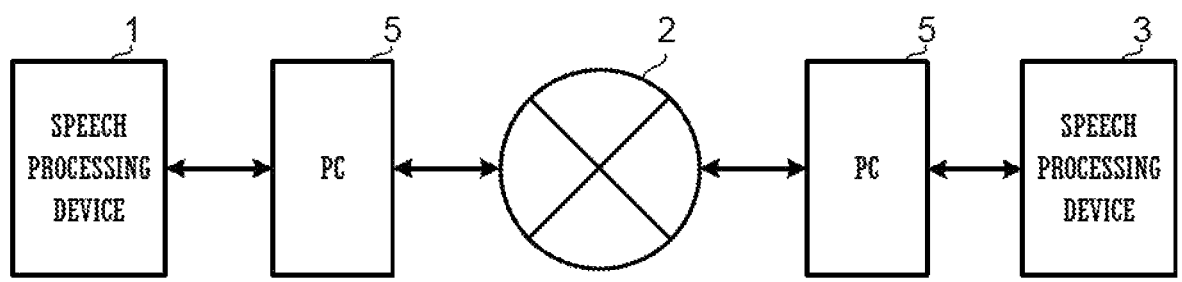
FIG. 10 is a diagram showing a configuration of the speech processing system in a case of connecting to a network through a PC.

While the above example shows that the speech processing device 1 is connected to the network 2, the speech processing device 1 may be connected to a network through a PC (Personal Computer) 5 being an information processor, for example, as shown in FIG. 10.

Figure 11:
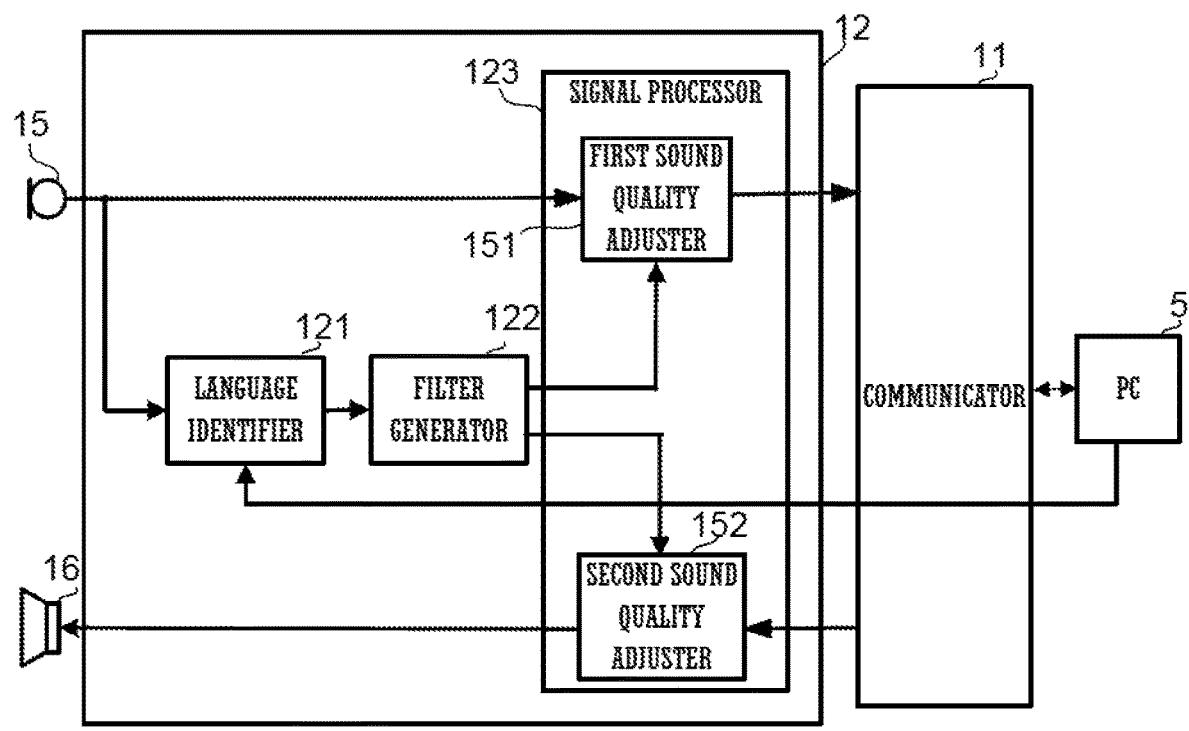
FIG. 11 is a block diagram showing a functional configuration of the speech processing device in a case of connecting to a network through a PC.

In such a case, as shown in FIG. 11, the language identifier 121 does not need to identify a language based on the information obtained from the PC 5. For example, the language identifier 121 may identify the language used by an OS installed in the PC 5 as a native language. In addition, the language identifier 121 may identify a native language based on a location corresponding to an IP address used by the PC 5.

Figure 12:
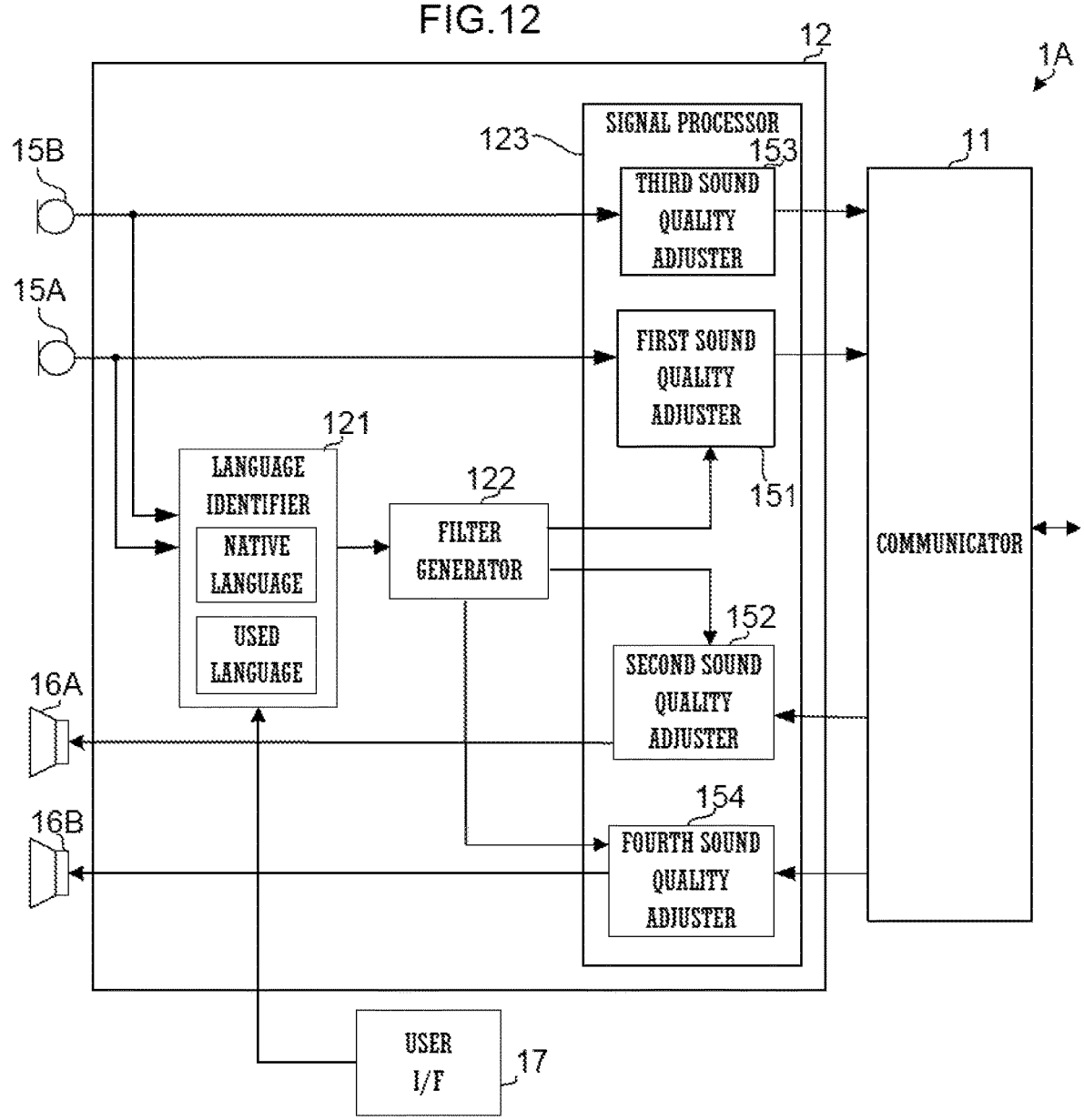
FIG. 12 is a block diagram showing a configuration of a speech processing device 1A in a case in which a plurality of users use an audio conference device in the same environment.

FIG. 12 is a block diagram showing a configuration of a speech processing device 1A in a case in which a plurality of users use an audio conference device in the same environment.

The speech processing device 1A includes a plurality of microphones (two microphones 15A and 15B in the example of FIG. 12) and a plurality of speakers (two speakers 16A and 16B in FIG. 12).

The speech processing device 1A adjusts sound quality individually for each microphone and each speaker. Therefore, the signal processor 123 further includes a third sound quality adjustor 153 and a fourth sound quality adjustor 154.

A user inputs the setting of a native language using the user I/F 17. For example, a user using the microphone 15A sets the native language as Japanese, and a user using the microphone 15B and the speaker 16B sets the native language as French. A used language may be English, for example.

The filter generator 122 generates a filter coefficient, with respect to the first sound quality adjustor 151 and the second sound quality adjustors 152, in order to obtain the sound quality that emphasizes the Japanese frequency band of 125 Hz to 1500 Hz and the English frequency band of 2000 Hz to 12000 Hz. In addition, the filter generator 122 generates a filter coefficient, with respect to the third sound quality adjustor 153 and the fourth sound quality adjustors 154, in order to obtain the sound quality that emphasizes the French frequency band of 125 Hz to 2000 Hz and the English frequency band of 2000 Hz to 12000 Hz.

As a result, for the user using the microphone 15A and the speaker 16A, the sound quality of English is able to be adjusted to make it easy for people of which the native language is Japanese to hear English. In addition, for the user using the microphone 15B and the speaker 16B, the sound quality of English is able to be adjusted to make it easy for people of which the native language is French to hear English. In other words, even in a case in which users having a different native language are present under the same environment, the sound quality adjustment is performed on an appropriate language for each user.

Finally, the foregoing preferred embodiments are illustrative in all points and should not be construed to limit the present invention. The scope of the present invention is defined not by the foregoing exemplary embodiment but by the following claims. Further, the scope of the present invention is intended to include all modifications within the scopes of the claims and within the meanings and scopes of equivalents.

For example, while the present preferred embodiment shows the band-pass filter processing as an example of signal processing, a speech processing device may use other signal processing. Speech speed conversion processing is also an example of signal processing in the present invention. In a case in which a native language is different from a used language, the speech processing device performs processing to reduce a speech speed, and thus improves listenability. In such a case, the speech processing device may associate a parameter of the speech speed with the combination of the native language and the used language, may read the parameter corresponding to the native language and the used language that have been identified, and may perform speech speed conversion processing. In addition, the filter processing is not limited to the band-pass filter processing. The filter processing is an example of filter processing that reduces an indirect sound such as a reverberant sound or the like, or noise removal processing, for example. In a case in which a native language is different from a used language, the speech processing device performs filter processing to reduce an indirect sound and noise, and thus improves listenability.

What is claimed is:

1. A speech processing device comprising:
   a language identifier that identifies a first language as a first native language of a first user and a first used language used by the first user, based on a first speech in the first used language made by the first user at a near-end-side, wherein the first native language is different from the first used language;
   a signal processor that performs signal processing on the first speech according to the first native language and the first used language that the language identifier has identified; and
   a communicator that transmits the first speech on which the signal processing has been performed by the signal processor to a far-end-side;
   wherein the signal processor performs the signal processing by superimposing a first parameter on a basis of the first native language that the language identifier has identified and a second parameter on a basis of the first used language that the language identifier has identified.

2. The speech processing device according to claim 1, wherein the signal processing emphasizes the first native language and the first used language that have been identified by the language identifier.

3. The speech processing device according to claim 1, wherein the first parameter on the basis of the first native language is a filter coefficient that the signal processor uses to perform filter processing.

4. The speech processing device according to claim 3, wherein the filter processing is band-pass filter processing.

5. The speech processing device according to claim 1, wherein the language identifier identifies the first used language by speech recognition processing.

6. The speech processing device according to claim 1, wherein the language identifier identifies the first native language based on an IP address used by the communicator.

7. The speech processing device according to claim 1, wherein the language identifier identifies the first native language based on a language used by the speech processing device or an information processor to be used with the speech processing device.

8. A teleconferencing device comprising:
   the speech processing device according to claim 1;
   a microphone; and
   a speaker, wherein
   the speech is an audio signal inputted to the microphone; and
   the speaker emits the speech that has been processed by a signal processor on the far-end-side.

9. A speech processing system comprising the speech processing device according to claim 1 including a plurality of speech processing devices.

10. A speech processing method comprising:
    identifying a language as a first native language of a first user and a first used language used by the first user, based on a first speech in the first used language made by the first user at a near-end-side, wherein the first native language is different from the first used language;
    performing signal processing on the first speech according to the first native language and the first used language that has been identified;
    transmitting the first speech on which the signal processing has been performed, to a far-end-side; and
    performing the signal processing by superimposing a parameter on a basis of the first native language that has been identified and a parameter on a basis of the first used language that has been identified.

11. The speech processing method according to claim 10, further comprising:
    receiving the speech from the near-end-side; and
    performing the signal processing on received speech, according to an identified language.

12. The speech processing method according to claim 10, wherein the signal processing emphasizes the first native language and the first used language that have been identified.

13. The speech processing method according to claim 10, wherein the first parameter on the basis of the first native language is a filter coefficient to be used to perform filter processing.

14. The speech processing method according to claim 13, wherein the filter processing is band-pass filter processing.

15. The speech processing method according to claim 10, wherein the first used language is identified by speech recognition processing.

16. The speech processing method according to claim 10, wherein the first native language is identified based on an IP address used for communication.

17. The speech processing method according to claim 10, wherein the first native language is identified based on a language used by a speech processing device or an information processor to be used with the speech processing device.

18. A speech processing device comprising:
   at least one memory device that stores instructions; and
   at least one processor that executes the instructions, wherein the instructions cause the processor to perform:
   identifying a language as a first native language of a first user and a first used language used by the first user, based on a first speech in the first used language made by the first user at a near-end-side, wherein the first native language is different from the first used language;
   performing signal processing on the first speech according to the first native language and the first used language that the identifying has identified;
   transmitting the first speech on which the signal processing has been performed by the performing to a far-end-side; and
   performing the signal processing by superimposing a first parameter on a basis of the first native language that has been identified and a second parameter on a basis of the first used language that has been identified.

19. A speech processing device comprising:
   a communicator that receives a second speech made by a second user at a far-end-side;
   a language identifier that identifies a language as a second native language of the second user and a second used language used by the second user, based on the second speech in the second used language, wherein the second native language is different from the second used language; and
   a signal processor that performs signal processing on the second speech according to the second native language and the second used language that the language identifier has identified, and outputs the processed signal,
   wherein the signal processer performs the signal processing by superimposing a third parameter on a basis of the second native language that the language identifier has identified and a fourth parameter on a basis of the second used language that the language identifier has identified.

* * * * *